3,060,126
EMULSION TYPE REMOVERS FOR REMOVING PROTECTIVE AND DECORATIVE COATINGS

Raymond T. Gerard and Thomas Anthony, Bay City, Mich., assignors to The Dow Chemical Company, Midland, Mich., a corporation of Delaware
No Drawing. Filed Feb. 2, 1959, Ser. No. 790,345
3 Claims. (Cl. 252—159)

This invention concerns novel emulsion-type removers of protective and decorative coatings of the paint, varnish and lacquer types, containing an alkali metal hydroxide and an organic solvent of the chlorinated aliphatic hydrocarbon type and mixtures thereof with aliphatic and aromatic hydrocarbon and chlorinated aliphatic ether types and thickened with a high molecular weight polystyrene microgel having from about 0.01 to about 0.1 weight percent of a combined crosslinking agent.

Emulsion-type paint removers containing alkali metal hydroxide and chlorinated hydrocarbon solvents thickened with thickeners such as combinations of starch, protein and methyl cellulose are known. They suffer from degradation of the thickeners with consequent emulsion breakdown and separation of phases.

It has now been discovered that stable oil-in-water emulsions highly satisfactory for removing various protective and decorative paint, varnish and lacquer coatings, can be prepared using as a stable thickener a polystyrene microgel, i.e., a high molecular weight polystyrene containing from about 0.01 to about 0.1 weight percent of a crosslinking agent such as divinylbenzene, hereinafter to be referred to as DVB. Such microgels have an average particle diameter of about 750 A. and a molecular weight of about 20 million to about 10 billion based on the mass of a particle, as calculated from its electron micrograph diameter, its density and the assumption that there is only one molecule per latex particle in the presence of appreciable crosslinking agent. This assumption is supported by the viscosity behavior of dilute solutions of the microgel.

Such microgels are prepared by emulsion polymerizing an oil-in-water emulsion containing up to about 50 weight percent styrene and from about 0.01 to about 0.1 weight percent of a crosslinking agent such as DVB at a temperature ranging between about 0° to 30° C. until polymerization is substantially complete, coagulating the resulting latex, advantageously by freeze coagulating, water-washing the coagulum to remove water soluble solids and drying under vacuum or in an inert, oxygen-free atmosphere at a temperature not above about 50° C. Alternatively the aqueous latex can be used as such.

Organic solvents used in the compositions of this invention include chlorinated aliphatic hydrocarbons such as methylene chloride, trichloropropane and perchloroethylene, aliphatic and aromatic hydrocarbon solvents, chlorinated aliphatic ethers such as di(chloroethyl) ether and the like, and mixtures thereof, containing at least 10 weight percent of methylene chloride, having a boiling point up to about 180° C., which are substantially non-reactive with alkali metal hydroxides at room temperature or thereabout. Methylene chloride can be used as the sole organic solvent.

Emulsifying agents which are not adversely affected by alkali, e.g., the well-known sulfate, sulfonate and nonionic types can be used, advantageously in amounts between about 1 and about 10 weight percent, total composition basis, to promote wetting and penetrating properties of the finish remover and to facilitate water rinsability. they are not a necessity so far as improved emulsion stability is concerned, since the microgel latex itself acts as an emulsifying agent to give an oil-in-water emulsion with aqueous base and organic solvent.

Alkali metal hydroxides used are preferably sodium hydroxide and potassium hydroxide. Other alkali metal hydroxides are considerably more expensive and no more useful than sodium or potassium hydroxides.

Generally proportions between about 5 to about 35 weight percent of sodium hydroxide or equivalent, about 10 to about 70 percent organic solvent, about 0.1 to about 6 percent of polystyrene microgel (dry basis), about 1 to about 10 percent of an emulsifier, if one is wanted, and the balance water, are used. When low boiling solvents are present, it is sometimes desirable to add a small amount of an evaporation retardant, e.g., a conventional wax such as paraffin wax or a polyhydric alcohol ester of a higher fatty acid, etc. A small amount of a conventional wetting agent stable to free alkali can also advantageously be added to promote wetting and penetrating characteristics for ready removal of the finish.

In practice, the emulsion-type removers are made by dissolving the free base in water, adding emulsifier thereto, if one is wanted, dispersing microgel latex in the organic solvent and adding this dispersion to the aqueous caustic phase with continuous agitation. Alternatively, dry microgel can be dissolved in the organic solvent prior to mixing into the aqueous phase. In either of the above methods of preparation, the emulsifier, if wanted, can be added last.

The emulsion removers are used by brushing, spraying or wiping onto the surface from which a protective or decorative coating is to be removed, and are allowed to stand until the finish degrades sufficiently to be removed. This requires from about 2 to about 30 minutes, generally. The degraded finish is then removed in usual ways, e.g., by a conventional scraper or the like, with a water rinse, by a combination of both or by steaming.

The following examples are in illustration and not in limitation of the invention, which is defined in the claims.

Example 1

A mixture of 10 weight parts methylene chloride
20 weight parts dichloroethyl ether
8 weight parts polystyrene microgel latex
(0.05 weight percent divinylbenzene, 25 percent solids, 75 percent water)

was added to a solution of 5 weight parts sodium lauryl sulfate in
57 weight parts aqueous 35 percent NaOH with continued agitation to form an oil-in-water emulsion which was still stable after more than 10 months at room temperature. This emulsion readily degraded conventional paint, varnish and lacquer finishes in about 2 to about 30 minutes. Debris is readily rinsed off with water.

Example 2

To a quantity of 46 weight percent methylene chloride was added 8 weight percent of polystyrene microgel latex (25 percent solids, containing 0.05 weight percent combined DVB). The resulting mixture was added with continuous agitation to 46 weight percent of aqueous 35 percent NaOH. The resulting oil-in-water emulsion was still stable after more than a year at room temperature. When applied to conventional paint, varnish, and lacquer coatings in usual ways the coatings were usually sufficiently degraded to be removable in 10 minutes or less.

What is claimed is:

1. An oil-in-water emulsion remover of paint, varnish and lacquer finishes the active ingredients of which consist of from about 0.1 to about 6 weight percent of a high molecular weight polystyrene microgel thickener containing from about 0.01 to about 0.1 weight percent of a combined divinylaryl crosslinking agent, about 10 to about 70 percent of a methylene chloride-containing organic solvent of the group consisting of methylene chloride and its mixtures with aromatic, other chlorinated aliphatic and chlorinated aliphatic ether solvents and their mixtures, having a boiling point up to about 180° C. and being substantially non-reactive with alkali metal hydroxides at substantially room temperature, at least 10 weight percent of which solvent is methylene chloride, about 5 to about 35 weight percent of an alkali metal hydroxide equivalent to 5 to 35 weight percent of sodium hydroxide, the balance being water.

2. The composition of claim 1, wherein the polystyrene thickener is crosslinked with between about 0.01 and about 0.1 weight percent of divinylbenzene, polymer basis.

3. The composition of claim 1, wherein about 1 to about 10 weight percent of an added oil-in-water emulsifying agent is also present.

References Cited in the file of this patent
UNITED STATES PATENTS

| | | |
|---|---|---|
| 1,568,753 | Littmann | Jan. 5, 1926 |
| 2,405,817 | D'Alelio | Aug. 13, 1946 |
| 2,662,837 | Duncan | Dec. 15, 1953 |
| 2,810,716 | Markus | Oct. 22, 1957 |
| 2,897,104 | Duncan | July 28, 1959 |

OTHER REFERENCES

The New Methocel, pp. 17–24, pub. by Dow Chemical Co., Midland, Mich. (1949).